United States Patent
Kahn et al.

(10) Patent No.: US 8,988,439 B1
(45) Date of Patent: Mar. 24, 2015

(54) MOTION-BASED DISPLAY EFFECTS IN A HANDHELD DEVICE

(75) Inventors: Philippe Kahn, Aptos, CA (US); Arthur Kinsolving, Santa Cruz, CA (US); Colin McClarin Cooper, Santa Cruz, CA (US); John Michael Fitzgibbons, San Jose, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 803 days.

(21) Appl. No.: 12/135,129

(22) Filed: Jun. 6, 2008

(51) Int. Cl.
*G06T 13/00* (2011.01)
*G06F 17/00* (2006.01)
*G09G 5/00* (2006.01)

(52) U.S. Cl.
USPC ............ 345/475; 345/418; 345/156

(58) Field of Classification Search
CPC .............. G06F 1/1626; G06F 1/1694
USPC ........................................... 345/418
See application file for complete search history.

(56) References Cited

U.S. PATENT DOCUMENTS

| | | | |
|---|---|---|---|
| 6,115,717 A | 9/2000 | Mehrotra et al. | |
| 6,347,290 B1 * | 2/2002 | Bartlett | 702/150 |
| 6,353,449 B1 | 3/2002 | Gregg et al. | |
| 6,834,249 B2 * | 12/2004 | Orchard | 702/141 |
| 7,457,719 B1 | 11/2008 | Kahn et al. | |
| 7,487,463 B2 | 2/2009 | Johnson | |
| 7,526,402 B2 | 4/2009 | Tanenhaus et al. | |
| 7,608,050 B2 | 10/2009 | Sugg | |
| 7,647,196 B2 | 1/2010 | Kahn et al. | |
| 7,653,508 B1 | 1/2010 | Kahn et al. | |
| 7,892,080 B1 | 2/2011 | Dahl | |
| 2003/0023685 A1 * | 1/2003 | Cousins et al. | 709/205 |
| 2003/0067475 A1 * | 4/2003 | Hirayama et al. | 345/589 |
| 2003/0109258 A1 | 6/2003 | Mantyjarvi et al. | |
| 2005/0046639 A1 * | 3/2005 | Leather | 345/584 |
| 2005/0151663 A1 * | 7/2005 | Tanguay | 340/691.2 |
| 2005/0202934 A1 | 9/2005 | Olrik et al. | |
| 2005/0212767 A1 * | 9/2005 | Marvit et al. | 345/158 |
| 2005/0219223 A1 * | 10/2005 | Kotzin et al. | 345/173 |
| 2005/0222801 A1 | 10/2005 | Wulff et al. | |
| 2006/0149516 A1 | 7/2006 | Bond et al. | |
| 2006/0164382 A1 * | 7/2006 | Kulas et al. | 345/156 |
| 2006/0181537 A1 | 8/2006 | Vasan et al. | |
| 2006/0284979 A1 | 12/2006 | Clarkson | |
| 2007/0073482 A1 | 3/2007 | Churchill et al. | |
| 2007/0125852 A1 | 6/2007 | Rosenberg | |
| 2007/0130582 A1 | 6/2007 | Chang et al. | |

(Continued)

OTHER PUBLICATIONS

Jane Hwang, Jaehoon Jung, and Gerard Jounghyun Kim. 2006. Hand-held virtual reality: a feasibility study. In Proceedings of the ACM symposium on Virtual reality software and technology (VRST '06). ACM, New York, NY, USA, 356-363.*

(Continued)

*Primary Examiner* — Kee M Tung
*Assistant Examiner* — Zhengxi Liu
(74) *Attorney, Agent, or Firm* — HIPLegal LLP; Judith A. Szepesi

(57) ABSTRACT

A method or apparatus to provide motion-based display effects in a mobile device is described. The method comprises determining a motion of the mobile device using an accelerometer. The method further comprises utilizing the motion of the mobile device to overlay a motion-based display effect on the display of the mobile device, in one embodiment to enhance the three-dimensional affect of the image.

16 Claims, 7 Drawing Sheets

(56) References Cited

U.S. PATENT DOCUMENTS

| | | | |
|---|---|---|---|
| 2007/0145680 | A1 | 6/2007 | Rosenberg |
| 2007/0213126 | A1 | 9/2007 | Deutsch et al. |
| 2007/0259716 | A1 | 11/2007 | Mattice et al. |
| 2007/0259717 | A1 | 11/2007 | Mattice et al. |
| 2007/0260482 | A1 | 11/2007 | Nurmela et al. |
| 2007/0269198 | A1 | 11/2007 | Park et al. |
| 2008/0010539 | A1 | 1/2008 | Roth |
| 2008/0028341 | A1 | 1/2008 | Szeliski et al. |
| 2008/0174598 | A1 | 7/2008 | Risenhoover |
| 2009/0124348 | A1 | 5/2009 | Yoseloff et al. |
| 2009/0310851 | A1 | 12/2009 | Arcas et al. |

OTHER PUBLICATIONS

Jeppe Frisvad, Niels Christenseny, and Peter Falster. 2005. Lighting Effects for Mobile Games. In Proceedings of {SIGRAD} 2005, Special Theme: Mobile Graphics.*

Jacorre Design Studio. "Animated Shine." www.jacorre.com/design/animatedshine.htm. Archived on May 22, 2007. Retrieved on Apr. 5, 2011 from <http://www.replay.waybackmachine.org/20070522062535/www.jacorre.com/design/animatedshine.htm>.*

"KPT Effects" http://www.1001graphictools.com/kpt5/. Archived on Jan. 4, 2005. Retrieved on Feb. 21, 2014 from <http://web.archive.org/web/20050104091021/http://www.1001graphictools.com/kpt5/>.*

Anderson, Ian, et al, "Shakra: Tracking and Sharing Daily Activity Levels with Unaugmented Mobile Phones," Mobile Netw Appl, Aug. 3, 2007, pp. 185-199.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

MacGregor, Ken, et al, "MuttZ: An Interactive Cellphone Game," Technical Report CS04-26-00, Department of Computer Science, University of Cape Town, Oct. 21, 2004, 4 pages.

* cited by examiner

MOTION-BASED DISPLAY EFFECTS IN A HANDHELD DEVICE

FIELD OF THE INVENTION

The present invention relates to display, and more particularly to motion-based display effects in mobile devices.

BACKGROUND

As handheld devices become more and more ubiquitous, people utilize these gadgets for everything from making phone calls, checking e-mail, and reading the news to playing games. In the past, these devices were primarily used to display text data, since the small screen made the display of image data impractical. However, as resolutions continue to increase, handheld devices are becoming used as gaming platforms as well as display platforms for various image-intensive applications.

As the displays improve in quality, users expect better quality, more features, and higher levels of realism from their handheld device.

SUMMARY

A method and apparatus to provide motion-based display effects in a handheld device is described. The system utilizes motion data derived from an accelerometer or other motion sensing device to provide display effects. In one embodiment, the display effect is a shadowing effect. In one embodiment, the display effect is a glimmer effect. In one embodiment, the display effect is a shine effect. In one embodiment, the display effect is a 3-dimensional perspective effect.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described are motion-based display effects displayed to alter an image on a screen of a handheld device based on motions of the handheld device itself. For example, if the device is displaying a 'gold' frame around a picture, as the device is tilted a shine may run along the gold frame, to simulate the appearance of such a frame in the real world. A glimmer effect may be displayed for a shiny object such as a diamond, sequin, or other shiny object. A shadowing effect may be shown for any three dimensionally represented item, such as a cube resting on a plane. A 3-dimensional perspective effect may be displayed for any three dimensionally represented item, such as a cube, allowing the user to look at the side of the object.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
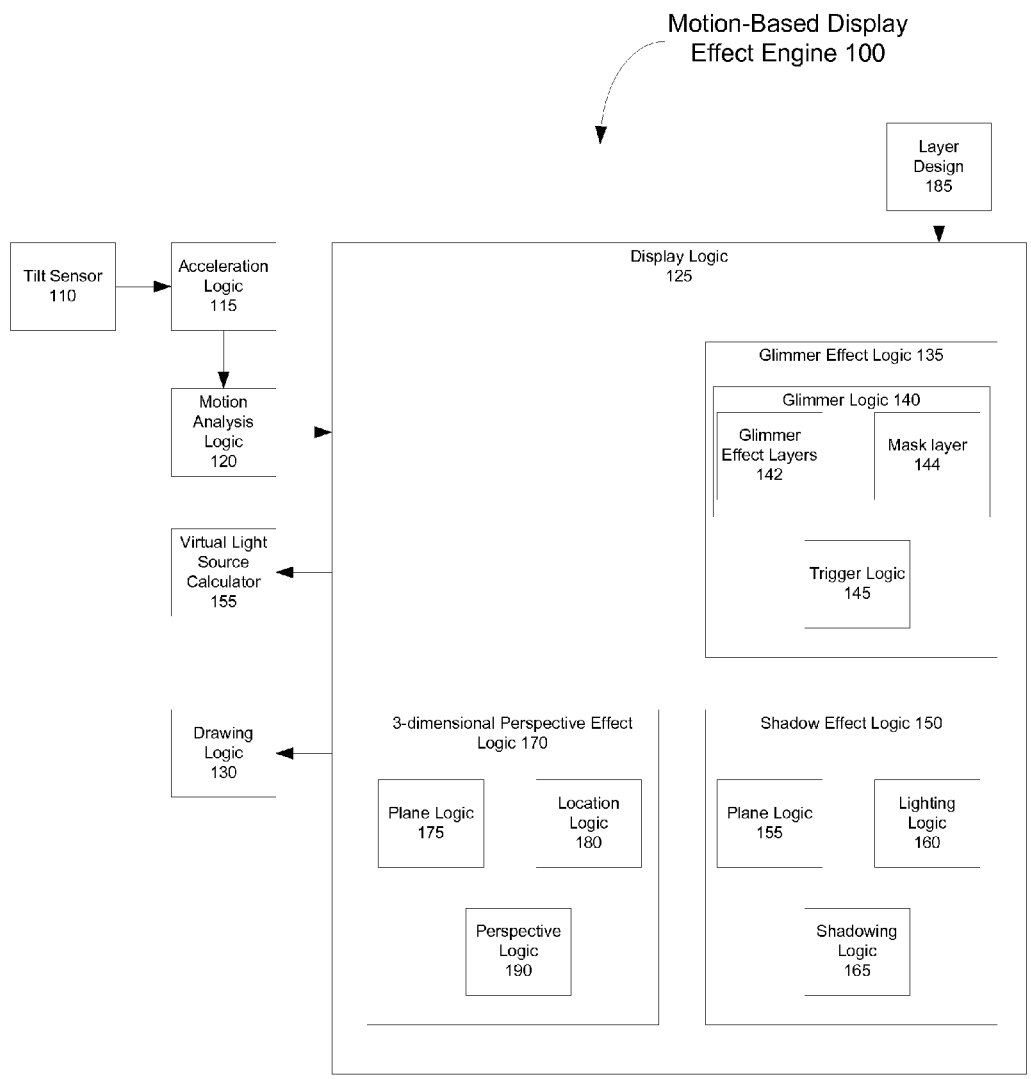
FIG. 1 is a block diagram of one embodiment of a motion-based display effect engine.

FIG. 1 is a block diagram of one embodiment of a motion-based display effect engine. The motion-based display effect engine 100 receives data from a tilt sensor 110. The tilt sensor, in one embodiment, is an accelerometer. In one embodiment, the accelerometer 110 may be a single 3D (3 axes) accelerometer. In one embodiment, the accelerometer 110 may be a 6D accelerometer, having three axes for linear motion plus three rotational axes. Alternatively, the accelerometer may be one or more 2D or 1D accelerometers.

The tilt sensor 110 is linked to acceleration logic 115. Acceleration logic 115 passes the relevant acceleration data to motion analysis logic 120. Motion analysis logic 120 identifies the type of movement detected, and passes the processed motion data to display logic 125. The display logic 125 provides the data to output to drawing logic 130.

Display logic 125 includes one or more effect logics. The illustrated effect logics here are glimmer effect logic 135, shadow effect logic 150, and 3-dimensional perspective effect logic 170. In one embodiment, other effect logics may be present.

Glimmer effect logic 135 generates glimmer effects. In one embodiment, glimmer effects include a shine, such as seen across glass when tilted, or across precious stones, etc. A glimmer effect, in one embodiment, may include glints, waves, shimmer, color change, or other effects. The glimmer 140 itself consists of two layers, a mask layer 144 and a glimmer effect layer 142.

In one embodiment, a mask layer for a glimmer effect is calculated by layer design 185.

The glimmer effect, in one embodiment, consists of light colored streaks set to an additive blend mode. In one embodiment, the mask, or primary, layer has an alpha channel applied to it that is locked in place over the display interface while the glimmer effect layer with the streaks is allowed to move independently of its alpha channel. The alpha channel defines the mask layer. The mask layer provides a "cutout" indicating where any glimmer effects would be appropriate. The cutouts correspond to the objects depicted in the image that would 'glimmer' in the real world such as metals and other shiny objects. In one embodiment, each type of object may have a separate mask and glimmer layer, e.g. a flat object would have a different glimmer layer than a curved object, or objects of different material may have different glimmer effects.

Using the alpha channel limits where the additive "glimmer" layer will show up, thus limiting the effect to only places where a glimmer effect is appropriate. In one embodiment, the glimmer logic 140 may add a slight blur to the alpha channel to simulate a light bloom effect, giving the impression of the glimmer being bright enough to bleed over into adjacent areas that are not set to feature the glimmer effect.

Figure 2:
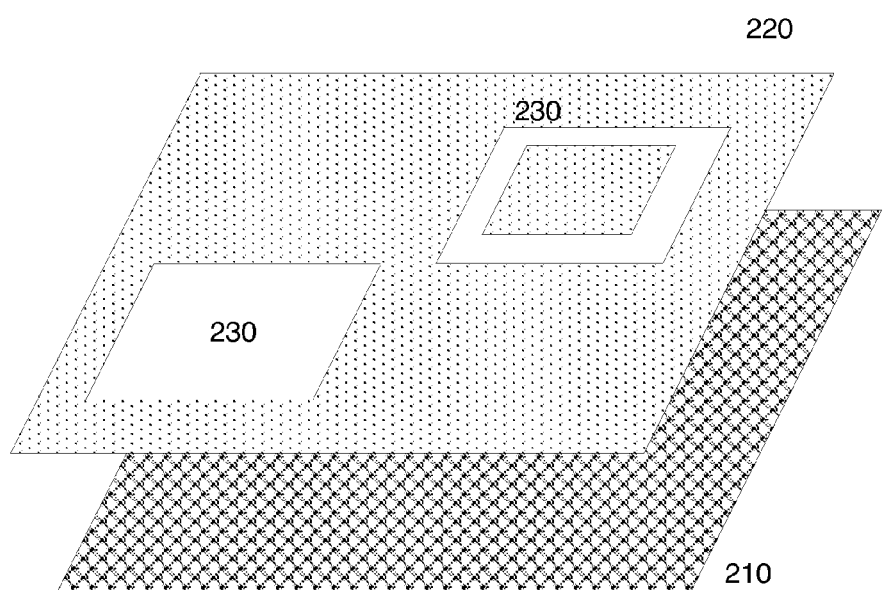
FIG. 2 is an illustration of one embodiment of the layers in a display which may be utilized to create the glimmer effect.

An exemplary exploded image is shown in FIG. 2. As can be seen, the underlying image 210 has a locked-in alpha/mask layer 220, which includes at least one cut-out 230. The cut-outs 230 are areas where any glimmer effect would be shown. When motion is detected, the glimmer effect is shifted over the image, showing only where the mask layer 220 exposes it. In this way, the glimmer effect can be displayed over any output image or video, by simply defining the appropriate type of glimmer and mask layer. In one embodiment, a single image may have multiple mask/glimmer layers, corresponding to different types of glimmer effects.

In one embodiment, while the mobile device is in a neutral position the glimmer layer remains available but is moved away from the main screen so no effect is present. As the tilt sensor 110 identifies the tilting of the handheld device, the selected layer is quickly moved in the opposite direction of the phone's tilt by glimmer logic 140 to simulate reflection of ambient lights on objects in the game interface. Glimmer logic 140 is activated by trigger logic 145 based on data from motion analysis logic 120. Thus, for an image displayed on a mobile device, areas of the image that represent reflective surfaces appear to reflect light. In one embodiment, any surface that is not parallel to the main screen of the device (gems for example, that have many reflective surfaces facing in different directions) could have one or more individual glimmer layers and alpha channels that are influenced by the handheld device's movement in a manner slightly offset to the main glimmer effect, to give the illusion of these additional faces reflecting light at a different angle than the surrounding flat surfaces.

In one embodiment, the texture for the glimmer effect may be a hemisphere reflection map. The layer design 185 in one embodiment first renders the base texture with shadows on it. Then, it does a second pass which is additive blended, and renders the reflection image onto the texture, using the mask to determine how much to blend (black areas would have zero contribution, white would have maximum contribution) and the angle of the camera and the normal vector of the surface to determine what part of the reflection map to use. In another embodiment, instead of a hemisphere-looking reflection map a cube-shaped environment map. In one embodiment, a simple circular blur may be used to create specular highlights.

In one embodiment, another motion-based display effect is a 3-dimensional perspective effect. The 3-dimensional perspective effect logic 170 calculates such effects. The 3D perspective effect appears as if there were a perspective camera placed above the 3D game world and its position above the game world were set to move opposite of the direction of phone tilt while its focal point remains fixed.

As the phone is tilted to the right the camera moves to the left, thus revealing the left side of 3D objects. For instance a simple box placed in the middle of the game world will appear as a simple square when viewed from the mobile device's neutral position. Plane logic 175 calculates the neutral plane, which defines the neutral position. In one embodiment, the neutral position may be horizontal, e.g. the mobile device placed on a flat surface. In one embodiment, the neutral position may be defined as facing the user at a natural orientation that users typically hold their devices at. Alternatively, the neutral position may be defined as a different orientation. As the device is tilted, the location logic 180 calculates the virtual "camera" moves, and while the box remains the focal point of the camera the angle of view is shifted by perspective logic 190. For example, as the mobile device is tilted left, the virtual camera moves right, so that the left side of the box is now visible. In one embodiment, one can move the handheld device just as one would do to inspect the side of the box as if it were a real object protruding from the face of the handheld device.

In one embodiment, another motion-based display effect is the shadow effect, provided by shadow effect logic 150. In one embodiment, the camera remains static but there is a light source that is linked to tilt. Thus, as the handheld is moved, a shadow layer is displayed. The shadow layer is calculated by shadowing logic 165.

The shadowing logic 165 calculates such effects. The shadow is displayed, in one embodiment, as if there were a light fixed at approximately light source is at about 10 o'clock and 45 degrees up from horizontal when the device is in neutral orientation. This is one exemplary location only, and other locations may be used. The location is chosen, in one embodiment, to provide an interesting shadow at the neutral orientation. The neutral orientation in one embodiment is the orientation in which the user will hold the device by default. In another embodiment, the neutral orientation is the horizontal position. Plane logic 155 calculates the neutral orientation, or neutral plane, and places the virtual light source 155 in its predetermined position in the neutral plane. Then, as the device is moved, lighting logic 160 determines the updated location of the virtual light source 155. This data is used by shadowing logic 165 to update the shadows. In one embodiment, when the device is moved to the maximum shadow, the shadow then starts to decrease (e.g. it appears as if there were two light sources so that the entire 360 degrees is covered.

Figure 3A:
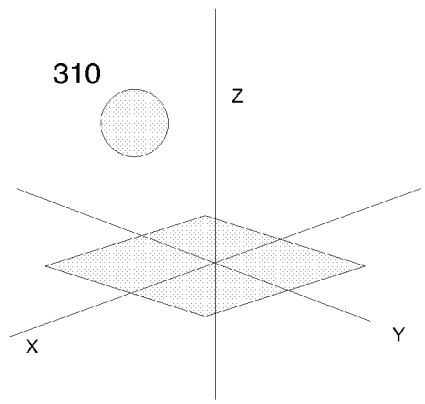
FIGS. 3A-C show the positioning of a virtual light source for a shadow effect.
Figure 3B:
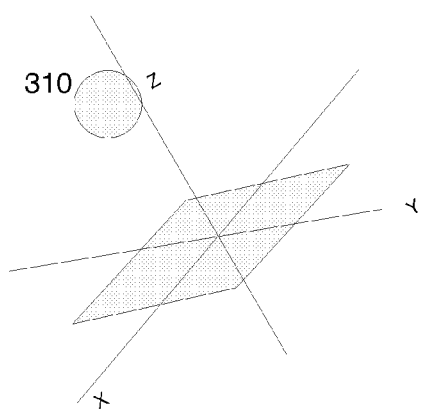
Figure 3C:
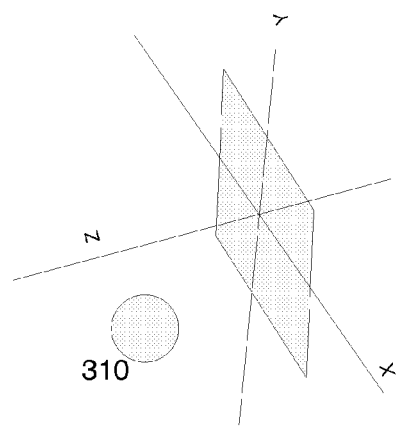

FIGS. 3A-C show various images of the virtual light source 310, to illustrate the feature. As can be seen, the light is initially in the top right corner of the device, when the device is vertical (FIG. 3A). As the device is tilted, the virtual light source 310 remains in the same position (FIG. 3B). In one embodiment, this is true for all positions of the device. In another embodiment, the virtual light 310 is stationary until the user tilts the device beyond the 90 degree angle. At that point, the light 310 is repositioned in the same corner, at the new orientation (FIG. 3C). Note that the locations and angles are arbitrary. That is, the virtual light source may be anywhere. In one embodiment, the default setting is such that the image displays a shadow at the horizontal as well as the normal viewing angle (for most people at an approximately 45 degree angle.)

Figure 4:
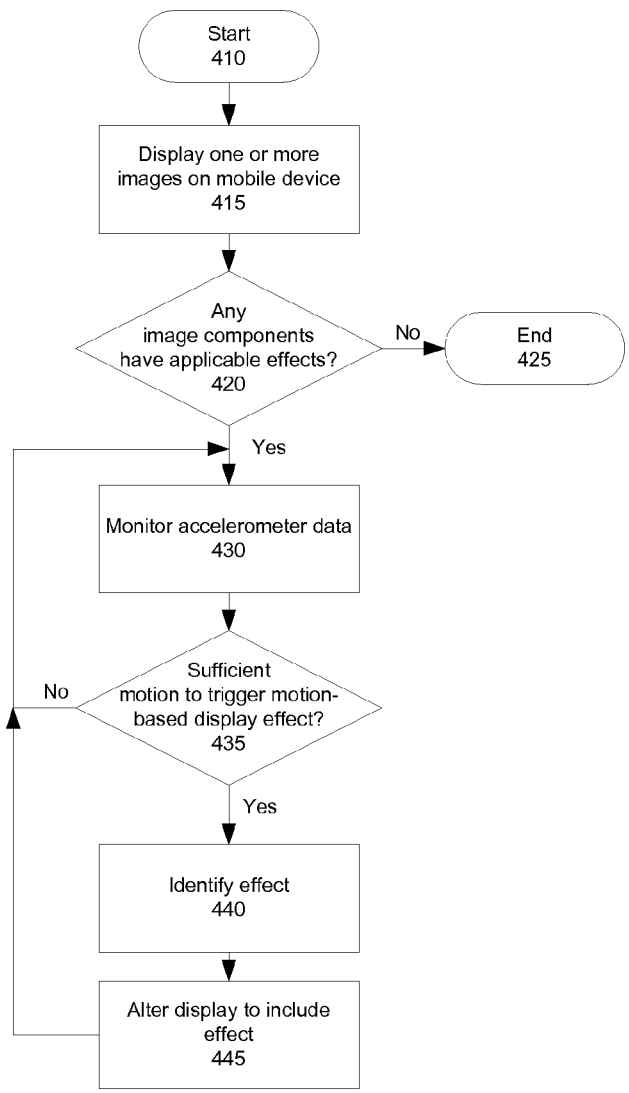
FIG. 4 is a flowchart of one embodiment of displaying the motion-based display effect.

FIG. 4 is a flowchart of one embodiment of displaying a motion-based display effect. The process starts at block 410. In one embodiment, this process only starts when an application that is motion-based display effect enabled is started. At block 415, one or more images are displayed on a mobile device. The images may be still images, moving images, video images. The images may be part of a game, image display, etc.

At block 420, the process determines whether there are any motion-based display effects associated with any of the image components. For example, if the available motion-based display effects include glimmer and shadow, the image should contain either something shiny or something three dimensional that would cast a shadow for the motion-based display effects to be available. If no such image components are present, the process ends at block 425. In one embodiment, this evaluation is continuously made as the images displayed on the device change.

If at least one image component has an applicable effect, the process continues to block 430. At block 430, the system monitors accelerometer data. In one embodiment, the image automatically displays any motion-based display effects associated with the current position.

At block 435, the process determines whether there was motion to trigger display of a motion-based display effect. If not, the process continues monitoring at block 430.

If there was motion, at block 440 the effect is identified. In one embodiment, separate threads are run for each applicable motion-based display effect. The "sufficient motion" test is applied separately by each thread, and the effect identification step may be skipped.

At block 445, the appropriate effect is displayed. For glimmer, a change in color, shine, or other attribute may be quickly whisked through the appropriate portions of the screen. For shadow, the shadow is moved to the appropriate location. For 3-dimensional perspective effect, the object display is shifted, to show a portion not previously visible of a three dimensional object, such as a side of a cube.

Figure 5:
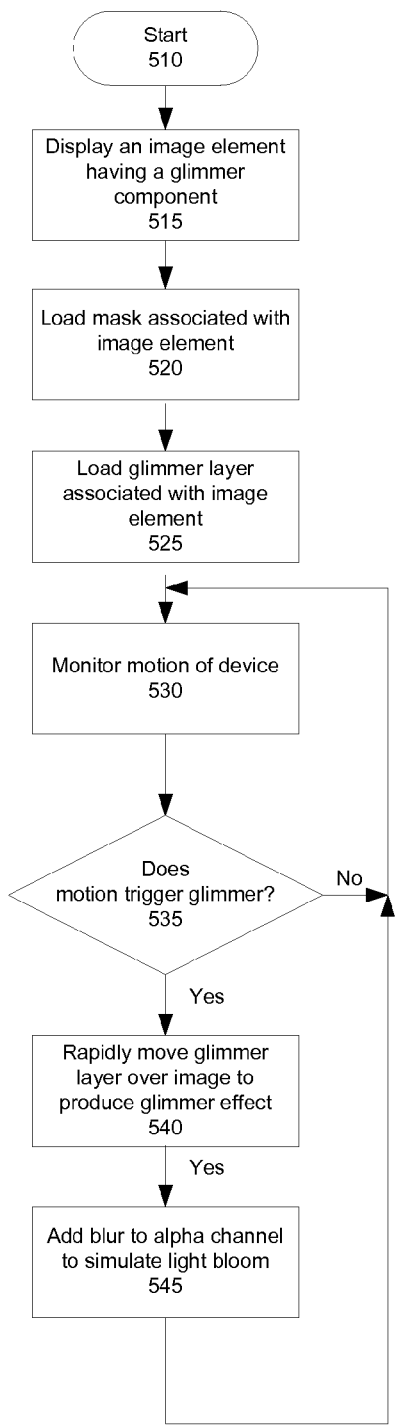
FIG. 5 is a flowchart of one embodiment of displaying a glimmer effect.

FIG. 5 is a flowchart of one embodiment of displaying a glimmer effect. The process starts at block 510. In one embodiment, the process starts when an application that includes at least one image feature that has a glimmer effect associated with it is loaded. Such applications may include built in applications—e.g. image display and manipulation programs, games, etc.

At block 515, the image element having the glimmer component is displayed. In one embodiment, this may only occur periodically in the game. Whenever there are no objects having a glimmer effect on the screen, the process halts, in one embodiment.

At block 520, the mask associated with the glimmer element is loaded. In one embodiment, the mask is used to define those areas of the screen that are exposed to glitter. For example, in an image manipulation program, the glimmer effect may only be applicable to a frame displayed around an image. The mask would have a cut-out matching the shape of the frame. In one embodiment, the mask and/or glimmer layer is part of the image itself and thus is automatically loaded when the image is loaded.

At block 525, the glimmer layer associated with the image is loaded. In one embodiment, the glimmer layer may be one of a shine, a color change, or a sparkle type layer. In one embodiment, the glimmer layer is pre-loaded, and placed in an area that is not showing through the mask layer.

At block 530, the device motion is monitored. In general, in real world situations glimmering occurs only sometimes, when the light hits an object just so. Therefore, in one embodiment, a virtual light source is used to model how the light hits the object.

At block 535, the process determines whether the motion triggers a glimmer. In one embodiment, certain motions or types of motions, trigger a glimmer. In one embodiment, to simulate a real life light source, there is also a "randomness" factor. Thus, the same movement may not trigger the glimmer effect in every instance. If not, the process continues to monitor at block 530. If the process hits a glimmer, the process continues to bock 540.

At block 540, the glimmer layer is rapidly moved over the image to produce the glimmer effect. As noted above, the masking layer eliminates the glimmer effect from areas that would not appropriately have glimmer. The glimmer layer, in one embodiment, is a set of light colored streaks. In another embodiment, the glimmer layer is a color changing layer.

In one embodiment, at block 545, a blur is added to the alpha channel (the masking layer), to simulate light bloom. In one embodiment, the blur is part of the masking layer, but the blur effect occurs while the glimmer is being shifted through the image. In one embodiment, much like when actual light is reflected along a surface, the glimmer effect is rapid and directional. The process then returns to block 530, to continue monitoring the device.

Figure 6:
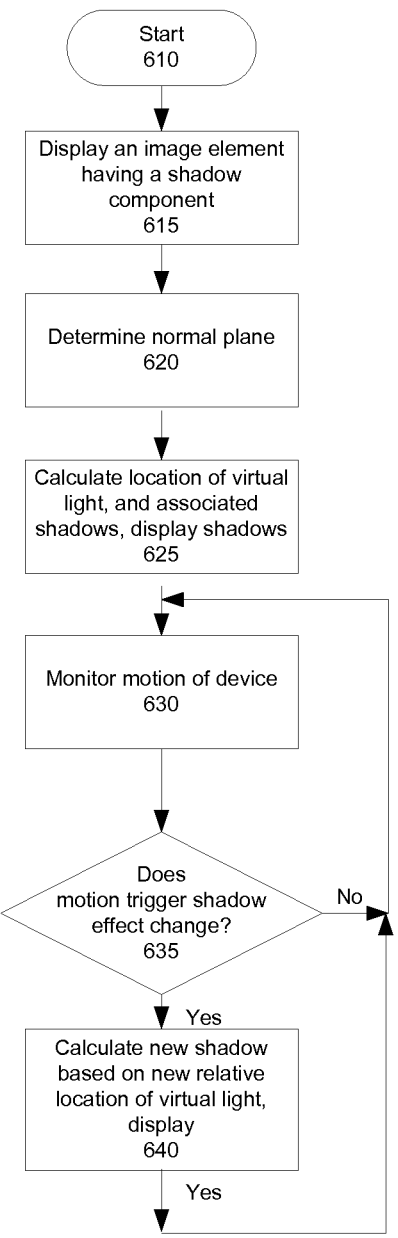
FIG. 6 is a flowchart of one embodiment of displaying a shadow effect.

FIG. 6 is a flowchart of one embodiment of displaying a shadow effect. The process starts at block 610. In one embodiment, the process is active whenever a shadow-effect enabled application is being displayed.

At block 615, an image element having a shadow component is displayed. Even in shadow-effect enabled applications, there may not always be an element on the screen that has a shadow. For example, in images which combine two dimensional and three dimensional features, only the three dimensional features would have a shadow effect applicable.

At block 620, the normal plane is determined. The normal plane is used to define the location of a virtual light, and is used along with the shape of the object to calculate the position of the shadow. In one embodiment, the normal plane is the horizontal plane, e.g. when the device is being held horizontally, with its normal bottom facing the user, the X-Y- and-Z axis are as one would visualize them (shown in FIG. 3A). In another embodiment, the normal plane is the plane in which the user holds the device normally. Most users do not interact with their handheld device while the device is resting on a flat surface horizontally. Rather, they tilt the device toward themselves to see the screen. In one embodiment a standard tilt for viewing the device in-hand is the normal plane. In one embodiment, that is 30% tilt up from the horizontal plane. In one embodiment, the normal plane definition may depend on the user's own behavior, e.g. if the user is primarily holding the device at an angle N, that angle may be used to define the normal plane. In another embodiment, the normal plane may be vertical.

At block 625, a location of the virtual light source is calculated. In one embodiment, the location of the virtual light is selected to provide at least some shadow effect at most normal angles. For example, most users when playing a game would move through a range of 5 degrees from horizontal through 90 degrees. The virtual light, in one embodiment, is selected to provide at least a minimal shadow effect at each of those locations.

At block 630, the device motion is monitored. In general, any motion which changes the relationship of the device to the virtual light would change the shadow. Therefore, in one embodiment, a virtual light source is used to model how the light hits the object.

At block 635, the process determines whether the motion triggers a change in the shadow display. If not, the process continues to monitor at block 630. If the shadow is changed by the motion, the process continues to bock 640.

At block 640, the new shadow is calculated based on the new relative location of the virtual light and the image. The shadow display is then updated. The process then returns to block 630, to continue monitoring the motion of the device. In one embodiment, the shadow is updated by shifting portions of the shadow display, rather than redrawing the entire shadow.

Figure 7:
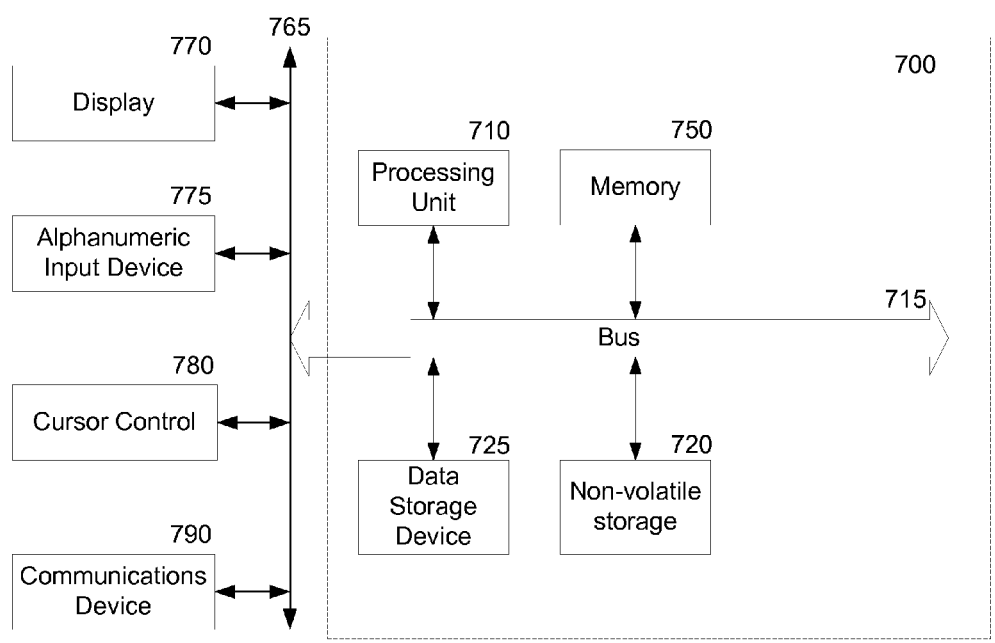
FIG. 7 is a block diagram of one embodiment of a computer system which may be used with the present invention.

FIG. 7 is a block diagram of one embodiment of a computer system which may be used with the present invention. FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   defining a neutral position of a handheld device;
   displaying an image on a display of the handheld device, the image including a first image component that is parallel to the display of the handheld device and a second image component that is not parallel to the display of the handheld device, the first image component associated with a first glimmer layer, the second image component associated with a second glimmer layer, the first glimmer layer moved away from the display of the handheld device when the handheld device is at the neutral position, such that no glimmer display effect is shown at the neutral position;
   in response to detecting a tilting of the handheld device,
      determining whether the tilting of the handheld device is sufficient to trigger the first glimmer layer; and
      when the tilting of the handheld device is sufficient to trigger the first glimmer layer, moving the first glimmer layer across the display of the handheld device in an opposite direction of a direction of the tilting of the handheld device, the first glimmer layer displaying a first glimmer display effect for the first image component, the first glimmer display effect altering a visual experience of the first image component on the display of the handheld device to provide a visual indication of responsiveness to the tilting of the handheld device, and
      displaying a second glimmer display effect for the second image component associated with the second glimmer layer, the second glimmer display effect offset to the first glimmer display effect, the second glimmer display effect altering a visual experience of the second image component on the display of the handheld device, the visual experience of the second image component different than the visual experience of the first image component.

2. The method of claim 1, wherein the image includes a plurality of image components with at least two of the image components having separate glimmer layers.

3. The method of claim 1, wherein the determining of whether the tilting of the handheld device is sufficient is based on a combination of identifying a sufficient motion level and a randomness factor such that the display of the first glimmer layer is unpredictable.

4. The method of claim 1, wherein moving displaying the first glimmer display effect comprises:
providing a mask layer with one or more cut-outs corresponding to image portions to which the first glimmer display effect applies, the mask layer fixed with respect to the image on the display; and
moving the first glimmer layer set to an additive blend mode across the display, such that the first glimmer display effect is visible in the one or more cut-outs of the mask layer.

5. The method of claim 1, further comprising:
displaying a shadow effect, the shadow effect chosen to be visible when the device is at a normal plane.

6. The method of claim 5, wherein displaying the shadow effect comprises:
positioning a virtual light source at an angle to the normal plane, the virtual light source used to calculate a shadow;
in response to the tilting of the handheld device, recalculating the shadow based on a changed angle between the virtual light source and a current angle of the handheld device, wherein the current angle of the handheld device is based on the tilting of the display of the handheld device; and
displaying an updated shadow effect based on the recalculated shadow.

7. The method of claim 1, further comprising:
displaying a 3-dimensional perspective effect for at least one 3-dimensional image component on the display of the handheld device, the 3-dimensional perspective effect displayed as a shadowing effect.

8. A handheld device including a display, comprising:
a tilt sensor to receive motion data, the tilt sensor further to detect a tilting of the handheld device;
a display logic to display an image on the display of the handheld device, the image including a first image component that is parallel to the display of the handheld device and a second image component that is not parallel to the display of the handheld device, the first image component associated with a first glimmer layer, the second image component associated with a second glimmer layer, the first glimmer layer moved away from the display of the handheld device when the handheld device is at a neutral position, such that no glimmer display effect is shown at the neutral position;
a motion analysis logic to determine whether the tilting of the handheld device is sufficient to trigger the first glimmer layer; and
the display logic to display a first glimmer display effect on the first image component on the display when the motion analysis logic determines that the tilting of the handheld device is sufficient to trigger the first glimmer display effect;
a glimmer effect logic triggered when the tilting of the handheld device is sufficient to trigger the first glimmer display effect, the glimmer effect logic
determining whether the tilting of the handheld device is sufficient to trigger the first glimmer layer; and
when the tilting of the handheld device is sufficient to trigger the first glimmer layer, moving the first glimmer layer across the display of the handheld device in an opposite direction of a direction of the tilting of the handheld device, the first glimmer layer displaying the first glimmer display effect for the first image component, the first glimmer display effect altering a visual experience of the first image component on the display of the handheld device to provide a visual indication of responsiveness to the tilting of the handheld device, and
displaying a second glimmer display effect for the second image component associated with the second glimmer layer, the second glimmer display effect offset to the first glimmer display effect, the second glimmer display effect altering a visual experience of the second image component on the display of the handheld device, the visual experience of the second image component different than the visual experience of the first image component.

9. The handheld device of claim 8, wherein the motion analysis logic determines whether the tilting is sufficient based on a combination of a motion level above a threshold and a randomness factor, such that the first glimmer display effect is unpredictable.

10. The handheld device of claim 8, wherein the glimmer effect logic comprises:
a mask layer associated with the image, the mask layer having one or more cut-outs associated with at least one image portion to which the first glimmer display effect applies, the mask layer fixed with respect to the of image on the display;
the first glimmer layer moving across the display in an additive blend mode with the mask layer such that the first glimmer display effect is observed in the one or more cut-outs of the mask layer.

11. The handheld device of claim 8, wherein the display logic further comprises a shadow effect logic.

12. The handheld device of claim 11, wherein the shadow effect logic is to calculate an effect of a virtual light source positioned at an angle to a normal plane, to calculate a shadow, and recalculate the shadow based on a changed angle between the virtual light source and a current angle of the handheld device based on the motion data from the tilt sensor.

13. The handheld device of claim 8, wherein the display logic comprises a 3-dimensional perspective effect logic.

14. A method comprising:
displaying an image including a plurality of image components on a display of a mobile device, the plurality of image components comprising a first image component that is parallel to the display of the mobile device and a second image component that is not parallel to the display of the handheld device, the first image component not having a first glimmer effect when the image is initially displayed, the second image component not having a second glimmer effect when the image is initially displayed;
detecting a motion of the mobile device;
determining whether the motion of the mobile device is sufficient to trigger the first glimmer effect; and
in response to determining that the motion is sufficient to trigger the first glimmer effect, determining whether or not a glimmer layer associated with the first image component should be activated based on a randomness factor;

when the glimmer layer associated with the first image component should be activated, moving the glimmer layer associated with the first image component across the display of the mobile device, such that the movement of the glimmer layer associated with the first image component displays the first glimmer effect and corresponds to the motion of the mobile device, the first glimmer effect altering a visual experience of the first image component on the display of the mobile device and designed to provide a visual indication of responsiveness to the motion of the mobile device, and displaying the second glimmer effect, the second glimmer effect offset to the first glimmer effect, the second glimmer effect altering a visual experience of the second image component on the display of the mobile device, the visual experience of the second image component different than the visual experience of the first image component.

15. The method of claim 14, wherein moving the glimmer layer associated with the first image component comprises:

providing a mask layer fixed with respect to the image on the display, the mask layer including one or more cutouts corresponding to a portion of the plurality of image components to which the first glimmer effect applies; and moving the glimmer layer associated with the first image component with light colored streaks set to an additive blend mode with the mask layer across the display for the first glimmer effect.

16. The method of claim 14, wherein a texture for the first glimmer effect comprises a hemisphere reflection map.

* * * * *